United States Patent
Gass

(10) Patent No.: US 7,832,314 B2
(45) Date of Patent: Nov. 16, 2010

(54) BRAKE POSITIONING SYSTEM

(75) Inventor: Stephen F. Gass, Wilsonville, OR (US)

(73) Assignee: SD3, LLC, Tualatin, OR (US)

(*) Notice: Subject to any disclaimer, the term of this patent is extended or adjusted under 35 U.S.C. 154(b) by 49 days.

(21) Appl. No.: 11/811,719

(22) Filed: Jun. 11, 2007

(65) Prior Publication Data

US 2008/0029184 A1    Feb. 7, 2008

Related U.S. Application Data

(63) Continuation of application No. 11/061,162, filed on Feb. 18, 2005, now Pat. No. 7,228,772, which is a continuation of application No. 09/929,244, filed on Aug. 13, 2001, now Pat. No. 6,857,345.

(60) Provisional application No. 60/225,056, filed on Aug. 14, 2000, provisional application No. 60/225,057, filed on Aug. 14, 2000, provisional application No. 60/225,058, filed on Aug. 14, 2000, provisional application No. 60/225,059, filed on Aug. 14, 2000, provisional application No. 60/225,089, filed on Aug. 14, 2000, provisional application No. 60/225,094, filed on Aug. 14, 2000, provisional application No. 60/225,169, filed on Aug. 14, 2000, provisional application No. 60/225,170, filed on Aug. 14, 2000, provisional application No. 60/225,200, filed on Aug. 14, 2000, provisional application No. 60/225,201, filed on Aug. 14, 2000, provisional application No. 60/225,206, filed on Aug. 14, 2000, provisional application No. 60/225,210, filed on Aug. 14, 2000, provisional application No. 60/225,211, filed on Aug. 14, 2000, provisional application No. 60/225,212, filed on Aug. 14, 2000.

(51) Int. Cl.
*B27B 5/29* (2006.01)
*B27B 3/28* (2006.01)

(52) U.S. Cl. .................. 83/58; 83/62.1; 83/DIG. 1; 83/490; 83/477.2; 83/471.3; 83/397.1

(58) Field of Classification Search .................. 83/58, 83/DIG. 1, 490, 477.2, 62.1, 72, 473, 488, 83/56, 76.7, 471.2, 478, 481, 485, 574, 821, 83/823, 665, 666, 954, 522.12, 471.3, 397.1; 144/382, 356, 154.5, 365, 384, 391, 420, 144/2.1, 426, 427, 20, 117.1, 128; 318/362, 318/364, 372, 445; 307/39; 361/143; 408/48, 408/18; 409/64, 207, 218, 288
See application file for complete search history.

(56) References Cited

U.S. PATENT DOCUMENTS 146,886 A    1/1874    Doane et al.

(Continued)

FOREIGN PATENT DOCUMENTS

CA    2140991    1/1995

(Continued)

OTHER PUBLICATIONS

Skil Model 3400-Type 1 10" Table Saw Parts List and Technical Bulletin, S-B Power Tool Company, Jun. 1993.

(Continued)

*Primary Examiner*—Ghassem Alie

(57) ABSTRACT

A saw is disclosed having a detection system adapted to detect a dangerous condition between a person and a saw blade, and a brake adapted to stop the saw blade in response to detection of the dangerous condition. The saw further includes a brake positioning system that allows the brake to be positioned in at least two different operable positions to accommodate at least two different blade diameters. The saw may include a system to detect brake-to-blade spacing.

7 Claims, 7 Drawing Sheets

U.S. PATENT DOCUMENTS

| | | |
|---|---|---|
| 162,814 A | 5/1875 | Graves et al. |
| 261,090 A | 7/1882 | Grill |
| 264,412 A | 9/1882 | Kuhlmann |
| 299,480 A | 5/1884 | Kuhlman et al. |
| 302,041 A | 7/1884 | Sill |
| 307,112 A | 10/1884 | Groff |
| 509,253 A | 11/1893 | Shields |
| 545,504 A | 9/1895 | Hoover |
| 869,513 A | 10/1907 | Pfeil |
| 941,726 A | 11/1909 | Pfalzgraf |
| 982,312 A | 1/1911 | Swafford |
| 997,720 A | 7/1911 | Troupenat |
| 1,037,843 A | 9/1912 | Ackley |
| 1,050,649 A | 1/1913 | Harrold et al. |
| 1,054,558 A | 2/1913 | Jones |
| 1,074,198 A | 9/1913 | Phillips |
| 1,082,870 A | 12/1913 | Humason |
| 1,101,515 A | 6/1914 | Adam |
| 1,126,970 A | 2/1915 | Folmer |
| 1,132,129 A | 3/1915 | Stevens |
| 1,148,169 A | 7/1915 | Howe |
| 1,154,209 A | 9/1915 | Rushton |
| 1,205,246 A | 11/1916 | Mowry |
| 1,228,047 A | 5/1917 | Reinhold |
| 1,240,430 A | 9/1917 | Erickson |
| 1,244,187 A | 10/1917 | Frisbie |
| 1,255,886 A | 2/1918 | Jones |
| 1,258,961 A | 3/1918 | Tattersall |
| 1,311,508 A | 7/1919 | Harrold |
| 1,324,136 A | 12/1919 | Turner |
| 1,381,612 A | 6/1921 | Anderson |
| 1,397,606 A | 11/1921 | Smith |
| 1,427,005 A | 8/1922 | McMichael |
| 1,430,983 A | 10/1922 | Granberg |
| 1,450,906 A | 4/1923 | Anderson |
| 1,464,924 A | 8/1923 | Drummond |
| 1,465,224 A | 8/1923 | Lantz |
| 1,492,145 A | 4/1924 | Talley |
| 1,496,212 A | 6/1924 | French |
| 1,511,797 A | 10/1924 | Berghold |
| 1,526,128 A | 2/1925 | Flohr |
| 1,527,587 A | 2/1925 | Hutchinson |
| 1,551,900 A | 9/1925 | Morrow |
| 1,553,996 A | 9/1925 | Federer |
| 1,582,483 A | 4/1926 | Runyan |
| 1,590,988 A | 6/1926 | Campbell |
| 1,600,604 A | 6/1926 | Sorlien |
| 1,616,478 A | 2/1927 | Watson |
| 1,640,517 A | 8/1927 | Procknow |
| 1,662,372 A | 3/1928 | Ward |
| 1,668,061 A | 5/1928 | Falkins |
| 1,701,948 A | 2/1929 | Crowe |
| 1,711,490 A | 5/1929 | Dummond |
| 1,712,828 A | 5/1929 | Klehm |
| 1,774,521 A | 9/1930 | Neighbour |
| 1,807,120 A | 5/1931 | Lewis |
| 1,811,066 A | 6/1931 | Tannewitz |
| 1,879,280 A | 9/1932 | James |
| 1,896,924 A | 2/1933 | Ulrich |
| 1,902,270 A | 3/1933 | Tate |
| 1,904,005 A | 4/1933 | Masset |
| 1,910,651 A | 5/1933 | Tautz |
| 1,938,548 A | 12/1933 | Tautz |
| 1,938,549 A | 12/1933 | Tautz |
| 1,963,688 A | 6/1934 | Tautz |
| 1,988,102 A | 1/1935 | Woodward |
| 1,993,219 A | 3/1935 | Merrigan |
| 2,007,887 A | 7/1935 | Tautz |
| 2,010,851 A | 8/1935 | Dummond |
| 2,020,222 A | 11/1935 | Tautz |
| 2,038,810 A | 4/1936 | Tautz |
| 2,075,282 A | 3/1937 | Hedgpeth |
| 2,095,330 A | 10/1937 | Hedgpeth |
| 2,106,288 A | 1/1938 | Tautz |
| 2,106,321 A | 1/1938 | Guertin |
| 2,121,069 A | 6/1938 | Collins |
| 2,131,492 A | 9/1938 | Ocenasek |
| 2,163,320 A | 6/1939 | Hammond |
| 2,168,282 A | 8/1939 | Tautz |
| 2,241,556 A | 5/1941 | MacMillian et al. |
| 2,261,696 A | 11/1941 | Ocenasek |
| 2,265,407 A | 12/1941 | Tautz |
| 2,286,589 A | 6/1942 | Tannewitz |
| 2,292,872 A | 8/1942 | Eastman |
| 2,312,118 A | 2/1943 | Neisewander |
| 2,313,686 A | 3/1943 | Uremovich |
| 2,328,244 A | 8/1943 | Woodward |
| 2,352,235 A | 6/1944 | Tautz |
| 2,377,265 A | 3/1945 | Rady |
| 2,392,486 A | 1/1946 | Larsen |
| 2,402,232 A | 6/1946 | Baker |
| 2,425,331 A | 8/1947 | Kramer |
| 2,434,174 A | 1/1948 | Morgan |
| 2,452,589 A | 2/1948 | McWhirter et al. |
| 2,466,325 A | 4/1949 | Ocenasek |
| 2,496,613 A | 2/1950 | Wooward |
| 2,501,134 A | 3/1950 | Meckoski et al. |
| 2,509,813 A | 5/1950 | Dineen |
| 2,517,649 A | 8/1950 | Frechtmann |
| 2,518,684 A | 8/1950 | Harris |
| 2,530,290 A | 11/1950 | Collins |
| 2,554,124 A | 5/1951 | Salmont |
| 2,562,396 A | 7/1951 | Schutz |
| 2,572,326 A | 10/1951 | Evans |
| 2,590,035 A | 3/1952 | Pollak |
| 2,593,596 A | 4/1952 | Olson |
| 2,601,878 A | 7/1952 | Anderson |
| 2,623,555 A | 12/1952 | Eschenburg |
| 2,625,966 A | 1/1953 | Copp |
| 2,626,639 A | 1/1953 | Hess |
| 2,661,777 A | 12/1953 | Hitchcock |
| 2,661,780 A | 12/1953 | Morgan |
| 2,675,707 A | 4/1954 | Brown |
| 2,678,071 A | 5/1954 | Odlum et al. |
| 2,690,084 A | 9/1954 | Van Dam |
| 2,695,638 A | 11/1954 | Gaskell |
| 2,704,560 A | 3/1955 | Woessner |
| 2,711,762 A | 6/1955 | Gaskell |
| 2,719,547 A | 10/1955 | Gjerde |
| 2,722,246 A | 11/1955 | Arnoldy |
| 2,731,049 A | 1/1956 | Akin |
| 2,736,348 A | 2/1956 | Nelson |
| 2,737,213 A | 3/1956 | Richards et al. |
| 2,758,615 A | 8/1956 | Mastriforte |
| 2,785,710 A | 3/1957 | Mowery, Jr |
| 2,786,496 A | 3/1957 | Eschenburg |
| 2,804,890 A | 9/1957 | Fink |
| 2,810,408 A | 10/1957 | Boice et al. |
| 2,839,943 A | 6/1958 | Caldwell et al. |
| 2,844,173 A | 7/1958 | Gaskell |
| 2,850,054 A | 9/1958 | Eschenburg |
| 2,852,047 A | 9/1958 | Odlum et al. |
| 2,873,773 A | 2/1959 | Gaskell |
| 2,876,809 A | 3/1959 | Rentsch et al. |
| 2,883,486 A | 4/1959 | Mason |
| 2,894,546 A | 7/1959 | Eschenburg |
| 2,913,025 A | 11/1959 | Richards |
| 2,913,581 A | 11/1959 | Simonton et al. |
| 2,937,672 A | 5/1960 | Gjerde |
| 2,945,516 A | 7/1960 | Edgemond, Jr. et al. |
| 2,954,118 A | 9/1960 | Anderson |
| 2,957,166 A | 10/1960 | Gluck |
| 2,978,084 A | 4/1961 | Vilkaitis |
| 2,984,268 A | 5/1961 | Vuichard |

| | | | | | |
|---|---|---|---|---|---|
| 2,991,593 A | 7/1961 | Cohen | 3,931,727 A | 1/1976 | Luenser |
| 3,005,477 A | 10/1961 | Sherwen | 3,935,777 A | 2/1976 | Bassett |
| 3,011,529 A | 12/1961 | Copp | 3,945,286 A | 3/1976 | Smith |
| 3,011,610 A | 12/1961 | Stiebel et al. | 3,946,631 A | 3/1976 | Malm |
| 3,013,592 A | 12/1961 | Ambrosio et al. | 3,947,734 A | 3/1976 | Fyler |
| 3,021,881 A | 2/1962 | Edgemond, Jr. et al. | 3,949,636 A | 4/1976 | Ball et al. |
| 3,035,995 A | 5/1962 | Seeley et al. | 3,953,770 A | 4/1976 | Hayashi |
| 3,047,116 A | 7/1962 | Stiebel et al. | 3,960,310 A | 6/1976 | Nussbaum |
| 3,085,602 A | 4/1963 | Gaskell | 3,967,161 A | 6/1976 | Lichtblau |
| 3,105,530 A | 10/1963 | Peterson | 3,974,565 A | 8/1976 | Ellis |
| 3,129,731 A | 4/1964 | Tyrrell | 3,975,600 A | 8/1976 | Marston |
| 3,163,732 A | 12/1964 | Abbott | 3,978,624 A | 9/1976 | Merkel et al. |
| 3,184,001 A | 5/1965 | Reinsch et al. | 3,994,192 A | 11/1976 | Faig |
| 3,186,256 A | 6/1965 | Reznick | 4,007,679 A | 2/1977 | Edwards |
| 3,207,273 A | 9/1965 | Jurin | 4,016,490 A | 4/1977 | Weckenmann et al. |
| 3,213,731 A | 10/1965 | Renard | 4,026,174 A | 5/1977 | Fierro |
| 3,224,474 A | 12/1965 | Bloom | 4,026,177 A | 5/1977 | Lokey |
| 3,232,326 A | 2/1966 | Speer et al. | 4,029,159 A | 6/1977 | Nymann |
| 3,246,205 A | 4/1966 | Miller | 4,047,156 A | 9/1977 | Atkins |
| 3,249,134 A | 5/1966 | Vogl et al. | 4,048,886 A | 9/1977 | Zettler |
| 3,274,876 A | 9/1966 | Debus | 4,060,160 A | 11/1977 | Lieber |
| 3,276,497 A | 10/1966 | Heer | 4,070,940 A | 1/1978 | McDaniel et al. |
| 3,306,149 A | 2/1967 | John | 4,075,961 A | 2/1978 | Harris |
| 3,313,185 A | 4/1967 | Drake et al. | 4,077,161 A | 3/1978 | Wyle et al. |
| 3,315,715 A | 4/1967 | Mytinger | 4,085,303 A | 4/1978 | McIntyre et al. |
| 3,323,814 A | 6/1967 | Phillips | 4,090,345 A | 5/1978 | Harkness |
| 3,337,008 A | 8/1967 | Trachte | 4,091,698 A | 5/1978 | Obear et al. |
| 3,356,111 A | 12/1967 | Mitchell | 4,106,378 A | 8/1978 | Kaiser |
| 3,368,596 A | 2/1968 | Comer | 4,117,752 A | 10/1978 | Yoneda |
| 3,386,322 A | 6/1968 | Stone et al. | 4,145,940 A | 3/1979 | Woloveke et al. |
| 3,439,183 A | 4/1969 | Hurst, Jr. | 4,152,833 A | 5/1979 | Phillips |
| 3,445,835 A | 5/1969 | Fudaley | 4,161,649 A | 7/1979 | Klos et al. |
| 3,454,286 A | 7/1969 | Anderson et al. | 4,175,452 A | 11/1979 | Idel |
| 3,456,696 A | 7/1969 | Gregory et al. | 4,184,394 A | 1/1980 | Gjerde |
| 3,512,440 A | 5/1970 | Frydmann | 4,190,000 A | 2/1980 | Shaull et al. |
| 3,538,964 A | 11/1970 | Warrick et al. | 4,195,722 A | 4/1980 | Anderson et al. |
| 3,540,338 A | 11/1970 | McEwan et al. | 4,199,930 A | 4/1980 | Lebet et al. |
| 3,554,067 A | 1/1971 | Scutella | 4,206,666 A | 6/1980 | Ashton |
| 3,566,996 A | 3/1971 | Crossman | 4,206,910 A | 6/1980 | Biesemeyer |
| 3,580,376 A | 5/1971 | Loshbough | 4,249,117 A | 2/1981 | Leukhardt et al. |
| 3,581,784 A | 6/1971 | Warrick et al. | 4,249,442 A | 2/1981 | Fittery |
| 3,593,266 A | 7/1971 | Van Sickle | 4,262,278 A | 4/1981 | Howard et al. |
| 3,613,748 A | 10/1971 | De Pue | 4,267,914 A | 5/1981 | Saar |
| 3,621,894 A | 11/1971 | Niksich | 4,270,427 A | 6/1981 | Colberg et al. |
| 3,670,788 A | 6/1972 | Pollak et al. | 4,276,459 A | 6/1981 | Willett et al. |
| 3,675,444 A | 7/1972 | Whipple | 4,276,799 A | 7/1981 | Muehling |
| 3,680,609 A | 8/1972 | Menge | 4,291,794 A | 9/1981 | Bauer |
| 3,688,815 A | 9/1972 | Ridenour | 4,305,442 A | 12/1981 | Currie |
| 3,695,116 A | 10/1972 | Baur | 4,319,146 A | 3/1982 | Wires, Sr. |
| 3,696,844 A | 10/1972 | Bernatschek | 4,321,841 A | 3/1982 | Felix |
| 3,716,113 A | 2/1973 | Kobayashi et al. | 4,334,450 A | 6/1982 | Benuzzi |
| 3,719,103 A | 3/1973 | Streander | 4,372,202 A | 2/1983 | Cameron |
| 3,745,546 A | 7/1973 | Struger et al. | 4,385,539 A | 5/1983 | Meyerhoefer et al. |
| 3,749,933 A | 7/1973 | Davidson | 4,391,358 A | 7/1983 | Haeger |
| 3,754,493 A | 8/1973 | Niehaus et al. | 4,418,597 A | 12/1983 | Krusemark et al. |
| 3,772,590 A | 11/1973 | Mikulecky et al. | 4,427,042 A | 1/1984 | Mitchell et al. |
| 3,785,230 A | 1/1974 | Lokey | 4,466,170 A | 8/1984 | Davis |
| 3,793,915 A | 2/1974 | Huier | 4,466,233 A | 8/1984 | Thesman |
| 3,805,639 A | 4/1974 | Peter | 4,470,046 A | 9/1984 | Betsill |
| 3,805,658 A | 4/1974 | Scott et al. | 4,503,739 A | 3/1985 | Konieczka |
| 3,808,932 A | 5/1974 | Russell | 4,510,489 A | 4/1985 | Anderson, III et al. |
| 3,829,850 A | 8/1974 | Guetersloh | 4,512,224 A | 4/1985 | Terauchi |
| 3,829,970 A | 8/1974 | Anderson | 4,518,043 A | 5/1985 | Anderson et al. |
| 3,858,095 A | 12/1974 | Friemann et al. | 4,532,501 A | 7/1985 | Hoffman |
| 3,861,016 A | 1/1975 | Johnson et al. | 4,532,844 A | 8/1985 | Chang et al. |
| 3,863,208 A | 1/1975 | Balban | 4,557,168 A | 12/1985 | Tokiwa |
| 3,880,032 A | 4/1975 | Green | 4,559,858 A | 12/1985 | Laskowski et al. |
| 3,882,744 A | 5/1975 | McCarroll | 4,560,033 A | 12/1985 | DeWoody et al. |
| 3,886,413 A | 5/1975 | Dow et al. | 4,566,512 A | 1/1986 | Wilson |
| 3,889,567 A | 6/1975 | Sato et al. | 4,573,556 A | 3/1986 | Andreasson |
| 3,905,263 A | 9/1975 | Smith | 4,576,073 A | 3/1986 | Stinson |
| 3,922,785 A | 12/1975 | Fushiya | 4,589,047 A | 5/1986 | Gaus et al. |
| 3,924,688 A | 12/1975 | Cooper et al. | 4,589,860 A | 5/1986 | Brandenstein et al. |

| | | | | | |
|---|---|---|---|---|---|
| 4,599,597 A | 7/1986 | Rotbart | 5,293,802 A | 3/1994 | Shiotani et al. |
| 4,599,927 A | 7/1986 | Eccardt et al. | 5,320,382 A | 6/1994 | Goldstein et al. |
| 4,606,251 A | 8/1986 | Boileau | 5,321,230 A | 6/1994 | Shanklin et al. |
| 4,615,247 A | 10/1986 | Berkeley | 5,331,875 A | 7/1994 | Mayfield |
| 4,621,300 A | 11/1986 | Summerer | 5,353,670 A | 10/1994 | Metzger, Jr. |
| 4,625,604 A | 12/1986 | Handler et al. | 5,377,554 A | 1/1995 | Reulein et al. |
| 4,637,188 A | 1/1987 | Crothers | 5,377,571 A | 1/1995 | Josephs |
| 4,637,289 A | 1/1987 | Ramsden | 5,392,568 A | 2/1995 | Howard, Jr. et al. |
| 4,644,832 A | 2/1987 | Smith | 5,392,678 A | 2/1995 | Sasaki et al. |
| 4,653,189 A | 3/1987 | Andreasson | 5,401,928 A | 3/1995 | Kelley |
| 4,657,428 A | 4/1987 | Wiley | 5,411,221 A | 5/1995 | Collins et al. |
| 4,661,797 A | 4/1987 | Schmall | 5,423,232 A | 6/1995 | Miller et al. |
| 4,672,500 A | 6/1987 | Tholome et al. | 5,436,613 A | 7/1995 | Ghosh et al. |
| 4,675,664 A | 6/1987 | Cloutier et al. | 5,447,085 A | 9/1995 | Gochnauer |
| 4,679,719 A | 7/1987 | Kramer | 5,451,750 A | 9/1995 | An |
| 4,718,229 A | 1/1988 | Riley | 5,453,903 A | 9/1995 | Chow |
| 4,722,021 A | 1/1988 | Hornung et al. | 5,471,888 A | 12/1995 | McCormick |
| 4,751,603 A | 6/1988 | Kwan | 5,480,009 A | 1/1996 | Wieland et al. |
| 4,756,220 A | 7/1988 | Olsen et al. | 5,503,059 A | 4/1996 | Pacholok |
| 4,757,881 A | 7/1988 | Jonsson et al. | 5,510,587 A | 4/1996 | Reiter |
| 4,760,685 A * | 8/1988 | Smith .................. 56/11.3 | 5,510,685 A | 4/1996 | Grasselli |
| 4,774,866 A | 10/1988 | Dehari et al. | 5,513,548 A | 5/1996 | Garuglieri |
| 4,792,965 A | 12/1988 | Morgan | 5,531,147 A | 7/1996 | Serban |
| 4,805,504 A | 2/1989 | Fushiya et al. | 5,534,836 A | 7/1996 | Schenkel et al. |
| 4,831,279 A | 5/1989 | Ingraham | 5,572,916 A | 11/1996 | Takano |
| 4,840,135 A | 6/1989 | Yamauchi | 5,587,618 A | 12/1996 | Hathaway |
| 4,845,476 A | 7/1989 | Rangeard et al. | 5,592,353 A | 1/1997 | Shinohara et al. |
| 4,864,455 A | 9/1989 | Shimomura et al. | 5,606,889 A | 3/1997 | Bielinski et al. |
| 4,875,398 A | 10/1989 | Taylor et al. | 5,619,896 A | 4/1997 | Chen |
| 4,896,607 A | 1/1990 | Hall et al. | 5,623,860 A | 4/1997 | Schoene et al. |
| 4,906,962 A | 3/1990 | Duimstra | 5,647,258 A | 7/1997 | Brazell et al. |
| 4,907,679 A | 3/1990 | Menke | 5,648,644 A | 7/1997 | Nagel |
| 4,934,233 A | 6/1990 | Brundage et al. | 5,659,454 A | 8/1997 | Vermesse |
| 4,936,876 A | 6/1990 | Reyes | 5,667,152 A | 9/1997 | Mooring |
| 4,937,554 A | 6/1990 | Herman | 5,671,633 A | 9/1997 | Wagner |
| 4,962,685 A | 10/1990 | Hagstrom | 5,695,306 A | 12/1997 | Nygren, Jr. |
| 4,964,450 A | 10/1990 | Hughes et al. | 5,700,165 A | 12/1997 | Harris et al. |
| 4,965,909 A | 10/1990 | McCullough et al. | 5,720,213 A | 2/1998 | Sbervegliri |
| 4,975,798 A | 12/1990 | Edwards et al. | 5,722,308 A | 3/1998 | Ceroll et al. |
| 5,020,406 A | 6/1991 | Sasaki et al. | 5,724,875 A | 3/1998 | Meredith et al. |
| 5,025,175 A | 6/1991 | Dubois, III | 5,730,165 A | 3/1998 | Philipp |
| 5,042,348 A | 8/1991 | Brundage et al. | 5,741,048 A | 4/1998 | Eccleston |
| 5,046,426 A | 9/1991 | Julien et al. | 5,755,148 A | 5/1998 | Stumpf et al. |
| 5,052,255 A | 10/1991 | Gaines | 5,771,742 A | 6/1998 | Bokaie et al. |
| 5,074,047 A | 12/1991 | King | 5,782,001 A | 7/1998 | Gray |
| 5,081,406 A | 1/1992 | Hughes et al. | 5,787,779 A | 8/1998 | Garuglieri |
| 5,082,316 A | 1/1992 | Wardlaw | 5,791,057 A | 8/1998 | Nakamura et al. |
| 5,083,973 A | 1/1992 | Townsend | 5,791,223 A | 8/1998 | Lanzer |
| 5,086,890 A | 2/1992 | Turczyn et al. | 5,791,224 A | 8/1998 | Suzuki et al. |
| 5,094,000 A | 3/1992 | Becht et al. | 5,791,441 A | 8/1998 | Matos et al. |
| 5,116,249 A | 5/1992 | Shiotani et al. | 5,797,307 A | 8/1998 | Horton |
| 5,119,555 A | 6/1992 | Johnson | 5,819,619 A | 10/1998 | Miller et al. |
| 5,122,091 A | 6/1992 | Townsend | 5,819,625 A | 10/1998 | Sbervegliri |
| 5,146,714 A | 9/1992 | Luber | 5,852,951 A | 12/1998 | Santi |
| 5,174,349 A | 12/1992 | Svetlik et al. | 5,857,507 A | 1/1999 | Puzio et al. |
| 5,184,534 A | 2/1993 | Lee | 5,861,809 A | 1/1999 | Eckstein et al. |
| 5,198,702 A | 3/1993 | McCullough et al. | 5,875,698 A | 3/1999 | Ceroll et al. |
| 5,199,343 A | 4/1993 | OBanion | 5,880,954 A | 3/1999 | Thomson et al. |
| 5,201,110 A | 4/1993 | Bane | 5,921,367 A | 7/1999 | Kashioka et al. |
| 5,201,684 A | 4/1993 | DeBois, III | 5,927,857 A | 7/1999 | Ceroll et al. |
| 5,206,625 A | 4/1993 | Davis | 5,930,096 A | 7/1999 | Kim |
| 5,207,253 A | 5/1993 | Hoshino et al. | 5,937,720 A | 8/1999 | Itzov |
| 5,212,621 A | 5/1993 | Panter | 5,942,975 A | 8/1999 | Sorenson |
| 5,218,189 A | 6/1993 | Hutchison | 5,943,932 A | 8/1999 | Sbervegliri |
| 5,231,359 A | 7/1993 | Masuda et al. | 5,950,514 A | 9/1999 | Benedict et al. |
| 5,231,906 A | 8/1993 | Kogej | 5,963,173 A | 10/1999 | Lian et al. |
| 5,239,978 A | 8/1993 | Plangetis | 5,974,927 A | 11/1999 | Tsune |
| 5,245,879 A | 9/1993 | McKeon | 5,989,116 A | 11/1999 | Johnson et al. |
| 5,257,570 A | 11/1993 | Shiotani et al. | 6,009,782 A | 1/2000 | Tajima et al. |
| 5,265,510 A | 11/1993 | Hoyer-Ellefsen | 6,018,284 A | 1/2000 | Rival et al. |
| 5,272,946 A | 12/1993 | McCullough et al. | 6,037,729 A | 3/2000 | Woods et al. |
| 5,276,431 A | 1/1994 | Piccoli et al. | D422,290 S | 4/2000 | Welsh et al. |
| 5,285,708 A | 2/1994 | Bosten et al. | 6,052,884 A | 4/2000 | Steckler et al. |

| | | | | | | |
|---|---|---|---|---|---|---|
| 6,062,121 | A | 5/2000 | Ceroll et al. | 6,874,397 B2 | 4/2005 | Chang |
| 6,070,484 | A | 6/2000 | Sakamaki | 6,874,399 B2 | 4/2005 | Lee |
| 6,095,092 | A | 8/2000 | Chou | 6,877,410 B2 | 4/2005 | Gass et al. |
| 6,112,785 | A | 9/2000 | Yu | 6,880,440 B2 | 4/2005 | Gass et al. |
| 6,119,984 | A | 9/2000 | Devine | 6,883,397 B2 | 4/2005 | Kimizuka |
| 6,131,629 | A | 10/2000 | Puzio et al. | 6,889,585 B1 | 5/2005 | Harris et al. |
| 6,133,818 | A | 10/2000 | Shieh et al. | 6,920,814 B2 | 7/2005 | Gass et al. |
| 6,141,192 | A | 10/2000 | Garzon | 6,922,153 B2 | 7/2005 | Pierga et al. |
| 6,148,504 | A | 11/2000 | Schmidt et al. | 6,945,148 B2 | 9/2005 | Gass et al. |
| 6,148,703 | A | 11/2000 | Ceroll et al. | 6,945,149 B2 | 9/2005 | Gass et al. |
| 6,150,826 | A | 11/2000 | Hokodate et al. | 6,968,767 B2 | 11/2005 | Yu |
| 6,161,459 | A | 12/2000 | Ceroll et al. | 6,986,370 B1 | 1/2006 | Schoene et al. |
| 6,170,370 | B1 | 1/2001 | Sommerville | 6,994,004 B2 | 2/2006 | Gass et al. |
| 6,244,149 | B1 | 6/2001 | Ceroll et al. | 6,997,090 B2 | 2/2006 | Gass et al. |
| 6,250,190 | B1 | 6/2001 | Ceroll et al. | 7,000,514 B2 | 2/2006 | Gass et al. |
| 6,257,061 | B1 | 7/2001 | Nonoyama et al. | 7,024,975 B2 | 4/2006 | Gass et al. |
| 6,283,002 | B1 | 9/2001 | Chiang | 2002/0017175 A1 | 2/2002 | Gass et al. |
| 6,295,910 | B1 | 10/2001 | Childs et al. | 2002/0017176 A1 | 2/2002 | Gass et al. |
| 6,325,195 | B1 | 12/2001 | Doherty | 2002/0017178 A1 | 2/2002 | Gass et al. |
| 6,330,848 | B1 | 12/2001 | Nishio et al. | 2002/0017179 A1 | 2/2002 | Gass et al. |
| 6,336,273 | B1 | 1/2002 | Nilsson et al. | 2002/0017180 A1 | 2/2002 | Gass et al. |
| 6,352,137 | B1 | 3/2002 | Stegall et al. | 2002/0017181 A1 | 2/2002 | Gass et al. |
| 6,357,328 | B1 | 3/2002 | Ceroll et al. | 2002/0017182 A1 | 2/2002 | Gass et al. |
| 6,366,099 | B1 | 4/2002 | Reddi | 2002/0017183 A1 | 2/2002 | Gass et al. |
| 6,376,939 | B1 | 4/2002 | Suzuki et al. | 2002/0017184 A1 | 2/2002 | Gass et al. |
| 6,404,098 | B1 | 6/2002 | Kayama et al. | 2002/0017336 A1 | 2/2002 | Gass et al. |
| 6,405,624 | B2 | 6/2002 | Sutton | 2002/0020261 A1 | 2/2002 | Gass et al. |
| 6,418,829 | B1 | 7/2002 | Pilchowski | 2002/0020262 A1 | 2/2002 | Gass et al. |
| 6,420,814 | B1 | 7/2002 | Bobbio | 2002/0020263 A1 | 2/2002 | Gass et al. |
| 6,427,570 | B1 | 8/2002 | Miller et al. | 2002/0020265 A1 | 2/2002 | Gass et al. |
| 6,430,007 | B1 | 8/2002 | Jabbari | 2002/0020271 A1 | 2/2002 | Gass et al. |
| 6,431,425 | B1 | 8/2002 | Moorman et al. | 2002/0043776 A1 | 4/2002 | Chuang |
| 6,450,077 | B1 | 9/2002 | Ceroll et al. | 2002/0050201 A1 | 5/2002 | Lane et al. |
| 6,453,786 | B1 | 9/2002 | Ceroll et al. | 2002/0056348 A1 | 5/2002 | Gass et al. |
| 6,460,442 | B2 | 10/2002 | Talesky et al. | 2002/0056349 A1 | 5/2002 | Gass et al. |
| 6,471,106 | B1 | 10/2002 | Reining | 2002/0056350 A1 | 5/2002 | Gass et al. |
| 6,479,958 | B1 | 11/2002 | Thompson et al. | 2002/0059853 A1 | 5/2002 | Gass et al. |
| 6,484,614 | B1 | 11/2002 | Huang | 2002/0059854 A1 | 5/2002 | Gass et al. |
| D466,913 | S | 12/2002 | Ceroll et al. | 2002/0069734 A1 | 6/2002 | Gass et al. |
| 6,492,802 | B1 | 12/2002 | Bielski | 2002/0088325 A1 | 7/2002 | Talesky et al. |
| D469,354 | S | 1/2003 | Curtsinger | 2002/0096030 A1 | 7/2002 | Wang |
| 6,502,493 | B1 | 1/2003 | Eccardt et al. | 2002/0109036 A1 | 8/2002 | Denen et al. |
| 6,536,536 | B1 | 3/2003 | Gass et al. | 2002/0134212 A1 | 9/2002 | Ceroll et al. |
| 6,543,324 | B2 | 4/2003 | Dils | 2002/0170399 A1 | 11/2002 | Gass et al. |
| 6,546,835 | B2 | 4/2003 | Wang | 2002/0170400 A1 | 11/2002 | Gass |
| 6,564,909 | B1 | 5/2003 | Razzano | 2002/0174755 A1 | 11/2002 | Behne et al. |
| 6,575,067 | B2 | 6/2003 | Parks et al. | 2002/0190581 A1 | 12/2002 | Gass et al. |
| 6,578,460 | B2 | 6/2003 | Sartori | 2003/0000359 A1 | 1/2003 | Eccardt et al. |
| 6,578,856 | B2 | 6/2003 | Kahle | 2003/0002942 A1 | 1/2003 | Gass et al. |
| 6,581,655 | B2 | 6/2003 | Huang | 2003/0005588 A1 | 1/2003 | Gass et al. |
| 6,595,096 | B2 | 7/2003 | Ceroll et al. | 2003/0015253 A1 | 1/2003 | Gass et al. |
| D478,917 | S | 8/2003 | Ceroll et al. | 2003/0019341 A1 | 1/2003 | Gass et al. |
| 6,601,493 | B1 | 8/2003 | Crofutt | 2003/0020336 A1 | 1/2003 | Gass et al. |
| 6,607,015 | B1 | 8/2003 | Chen | 2003/0037651 A1 | 2/2003 | Gass et al. |
| D479,538 | S | 9/2003 | Welsh et al. | 2003/0037655 A1 | 2/2003 | Chin-Chin |
| 6,617,720 | B1 | 9/2003 | Egan, III et al. | 2003/0056853 A1 | 3/2003 | Gass et al. |
| 6,619,348 | B2 | 9/2003 | Wang | 2003/0058121 A1 | 3/2003 | Gass et al. |
| 6,640,683 | B2 | 11/2003 | Lee | 2003/0074873 A1 | 4/2003 | Freiberg et al. |
| 6,644,157 | B2 | 11/2003 | Huang | 2003/0089212 A1 | 5/2003 | Parks et al. |
| 6,647,847 | B2 | 11/2003 | Hewitt et al. | 2003/0090224 A1 | 5/2003 | Gass et al. |
| 6,659,233 | B2 | 12/2003 | DeVlieg | 2003/0101857 A1 | 6/2003 | Chuang |
| 6,684,750 | B2 | 2/2004 | Yu | 2003/0109798 A1 | 6/2003 | Kermani |
| 6,722,242 | B2 | 4/2004 | Chuang | 2003/0131703 A1 | 7/2003 | Gass et al. |
| 6,734,581 | B1 | 5/2004 | Griffis | 2003/0140749 A1 | 7/2003 | Gass et al. |
| 6,736,042 | B2 | 5/2004 | Behne et al. | 2003/0213349 A1 | 11/2003 | Chang |
| 6,742,430 | B2 | 6/2004 | Chen | 2004/0011177 A1 | 1/2004 | Huang |
| 6,796,208 | B1 | 9/2004 | Jorgensen | 2004/0040426 A1 | 3/2004 | Gass et al. |
| 6,800,819 | B2 | 10/2004 | Sato et al. | 2004/0060404 A1 | 4/2004 | Metzger, Jr. |
| 6,826,988 | B2 | 12/2004 | Gass et al. | 2004/0104085 A1 | 6/2004 | Lang et al. |
| 6,826,992 | B1 | 12/2004 | Huang | 2004/0159198 A1 | 8/2004 | Peot et al. |
| 6,840,144 | B2 | 1/2005 | Huang | 2004/0194594 A1 | 10/2004 | Dils et al. |
| 6,854,371 | B2 | 2/2005 | Yu | 2004/0200329 A1 | 10/2004 | Sako |
| 6,857,345 | B2 | 2/2005 | Gass et al. | 2004/0226424 A1 | 11/2004 | O'Banion et al. |

| | | | |
|---|---|---|---|
| 2004/0226800 A1 | 11/2004 | Pierga et al. | |
| 2004/0255745 A1 | 12/2004 | Peot et al. | |
| 2005/0057206 A1 | 3/2005 | Uneyama | |
| 2005/0066784 A1 | 3/2005 | Gass | |
| 2005/0092149 A1 | 5/2005 | Hartmann | |
| 2005/0139051 A1 | 6/2005 | Gass et al. | |
| 2005/0139056 A1 | 6/2005 | Gass et al. | |
| 2005/0139057 A1 | 6/2005 | Gass et al. | |
| 2005/0139058 A1 | 6/2005 | Gass et al. | |
| 2005/0139459 A1 | 6/2005 | Gass et al. | |
| 2005/0155473 A1 | 7/2005 | Gass | |
| 2005/0166736 A1 | 8/2005 | Gass et al. | |
| 2005/0178259 A1 | 8/2005 | Gass et al. | |
| 2005/0204885 A1 | 9/2005 | Gass et al. | |
| 2005/0211034 A1 | 9/2005 | Sasaki et al. | |
| 2005/0235793 A1 | 10/2005 | O'Banion et al. | |
| 2005/0274432 A1 | 12/2005 | Gass et al. | |
| 2006/0000337 A1 | 1/2006 | Gass | |
| 2006/0032352 A1 | 2/2006 | Gass et al. | |
| 2006/0123960 A1 | 6/2006 | Gass et al. | |
| 2006/0123964 A1 | 6/2006 | Gass et al. | |

FOREIGN PATENT DOCUMENTS

| | | |
|---|---|---|
| CH | 297525 | 6/1954 |
| DE | 76186 | 8/1921 |
| DE | 2917497 | 4/1979 |
| DE | 2800403 | 7/1979 |
| DE | 3427733 | 1/1986 |
| DE | 4235161 | 5/1993 |
| DE | 4326313 | 2/1995 |
| DE | 19609771 | 6/1998 |
| EP | 146460 | 11/1988 |
| ES | 2152184 | 1/2001 |
| FR | 2556643 | 6/1985 |
| FR | 2570017 | 3/1986 |
| GB | 598204 | 2/1948 |
| GB | 1132708 | 11/1968 |
| GB | 2096844 | 10/1982 |
| GB | 2142571 | 1/1985 |

OTHER PUBLICATIONS

Shop Fox® Fence Operating Manual, Woodstock International, Inc., 1996, revised May 1997.
Gordon Enginering Corp., Product Catalog, pp. cover, 1, 3 and back, Brookfield, Connecticut, US, Oct. 1997.
Analog Devices, Inc., 3-Axis Capacitive Sensor—Preliminary Technical Data AD7103, pp. 1-40, © 1998.
U.S. Appl. No. 60/157,340, filed Oct. 1, 1999, entitled "Fast-Acting Safety Stop."
U.S. Appl. No. 60/182,866, filed Feb. 16, 2000, entitled "Fast-Acting Safety Stop."
IWF 2000 Challengers Award Official Entry Form, submitted Apr. 26, 2000, 6 pages plus CD (the portions of U.S. patent applications referenced in the form are from U.S. Appl. No. 60/157,340, filed Oct. 1, 1999 and U.S. Appl. No. 60/182,866, filed Feb. 16, 2000).
Excaliber T-Slot Precision Saw Fence Model TT45 Owner's Manual, Sommerville Design & Manufacturing, Inc., May 2000.
Bosch Model 4000 Worksite Table Saw Operating/Safety Instructions, S-B Power Tool Company, Jul. 2000.
XACTA Fence II™ Homeshop 30/52 Owner's Manual, JET Equipment & Tools, Mar. 2001.
XACTA Fence II™ Commercial 30/50 Owner's Manual, JET Equipment & Tools, Mar. 2001.
Bosch 10" Table Saw Model 0601476139 Parts List and Technical Bulletin, S-B Power Tool Company, Apr. 2001.
Biesemeyer® T-Square® Universal Home Shop Fence system Instruction Manual, Delta Machinery, Jun. 1, 2001.
Powermatic 10" Tilting Arbor Saw Model 66 Instruction Manual & Parts List, JET Equipment & Tools, Jun. 2001.
Skil Model 3400 Table Saw Operating/Safety Instructions, S-B Power Tool Co., Sep. 2001.
Tablesaw Splitters and Blade Covers, *Fine Woodworking*, pp. 77-81, Dec. 2001.
The Merlin Splitter by Excalibur a Sommerville Design Product Overview & Generic Installation Notes, Sommerville Design & Manufacturing Inc., at least as early as 2002.
INCRA Incremental Micro Precision Table Saw Fence Owner's Manual, Taylor Design Group, Inc., 2003.
Shop Fox® Models W2005, W2006, W2007 Classic Fence Instruction Manual, Woodstock International, Jan. 2000, revised Mar. 2004.
ACCU-FENCE® 64A Fence and Rail System Owner's Manual, WMH Tool Group, Sep. 2004.
Unifence™ Saw Guide Instruction Manual, Delta Machinery, Feb. 22, 2005.
Biesemeyere® T-Square® Commercial Fence System Instruction Manual, Delta Machinery, May 2, 2005.
Young Inventor: Teen's Device Earns Her Trip to Science Fair, *The Arizona Republic*, May 5, 2006.
Operator Injury Mitigation Using Electronic Sensing and Mechanical Braking and Decoupling Devices in Handheld Circular Saws, Erin F. Eppard, date unknown.
*You Should Have Invented It*, French television show video.
Laguna Tools table saw owner's manual, date unknown.

* cited by examiner

BRAKE POSITIONING SYSTEM

CROSS-REFERENCE TO RELATED APPLICATIONS

This application is a continuation of U.S. patent application Ser. No. 11/061,162, filed Feb. 18, 2005, issuing as U.S. Pat. No. 7,228,772 on Jun. 12, 2007, which was a continuation of U.S. patent application Ser. No. 09/929,244, filed Aug. 13, 2001, issuing as U.S. Pat. No. 6,857,345 on Feb. 22, 2005, which claims the benefit of and priority from the following U.S. Provisional Patent Applications: Ser. No. 60/225,056, filed Aug. 14, 2000, Ser. No. 60/225,057, filed Aug. 14, 2000, Ser. No. 60/225,058, filed Aug. 14, 2000, Ser. No. 60/225,059, filed Aug. 14, 2000, Ser. No. 60/225,089, filed Aug. 14, 2000, Ser. No. 60/225,094, filed Aug. 14, 2000, Ser. No. 60/225,169, filed Aug. 14, 2000, Ser. No. 60/225,170, filed Aug. 14, 2000, Ser. No. 60/225,200, filed Aug. 14, 2000, Ser. No. 60/225,201, filed Aug. 14, 2000, Ser. No. 60/225,206, filed Aug. 14, 2000, Ser. No. 60/225,210, filed Aug. 14, 2000, Ser. No. 60/225,211, filed Aug. 14, 2000, and Ser. No. 60/225,212, filed Aug. 14, 2000. All of these patents and applications are incorporated by reference in their entireties.

FIELD

The present invention relates to safety braking systems and more particularly to a brake positioning system for use in a fast acting safety brake system.

BACKGROUND

Various active safety systems have been developed to prevent injury to a user if they approach or come into contact with a dangerous portion of a machine. Such systems typically include two components: a detection portion and a braking portion. U.S. Pat. Nos. 3,785,230 and 4,026,177 to Lokey describe one such system. The system of Lokey uses a detection system that detects dangerous proximity of a part of a user's body. The system relies on a radio-frequency proximity detection. When the detection system detects a dangerous condition, a solenoid is triggered to shift a brake into engagement with the blade. Because the system of Lokey does not wait for contact to occur, the relatively low brake actuation speed provided by a direct-acting solenoid may be adequate to prevent injury. However, in a system that relies on contact detection, the braking time must be minimized. Even in proximity-based systems, it is beneficial to reduce braking time to minimize the chance of injury.

In a system that utilizes a brake to stop the machine, the spacing between the brake and the portion of the machine to be braked—typically a cutter or saw blade—can lead to significant delays in brake action. For instance, a solenoid may supply a few pounds of force over an eighth of an inch. With a relatively light brake of 150 g, a solenoid capable of generating 10 pounds of force takes five milliseconds to move the brake an eighth of an inch. Thus, it is important that the brake be located as close as possible to the portion of the machine to be stopped. However, where the brake contacts the blade directly, the position of the brake may need to be adjustable to accommodate variations in blade size.

DETAILED DESCRIPTION

Figure 1:
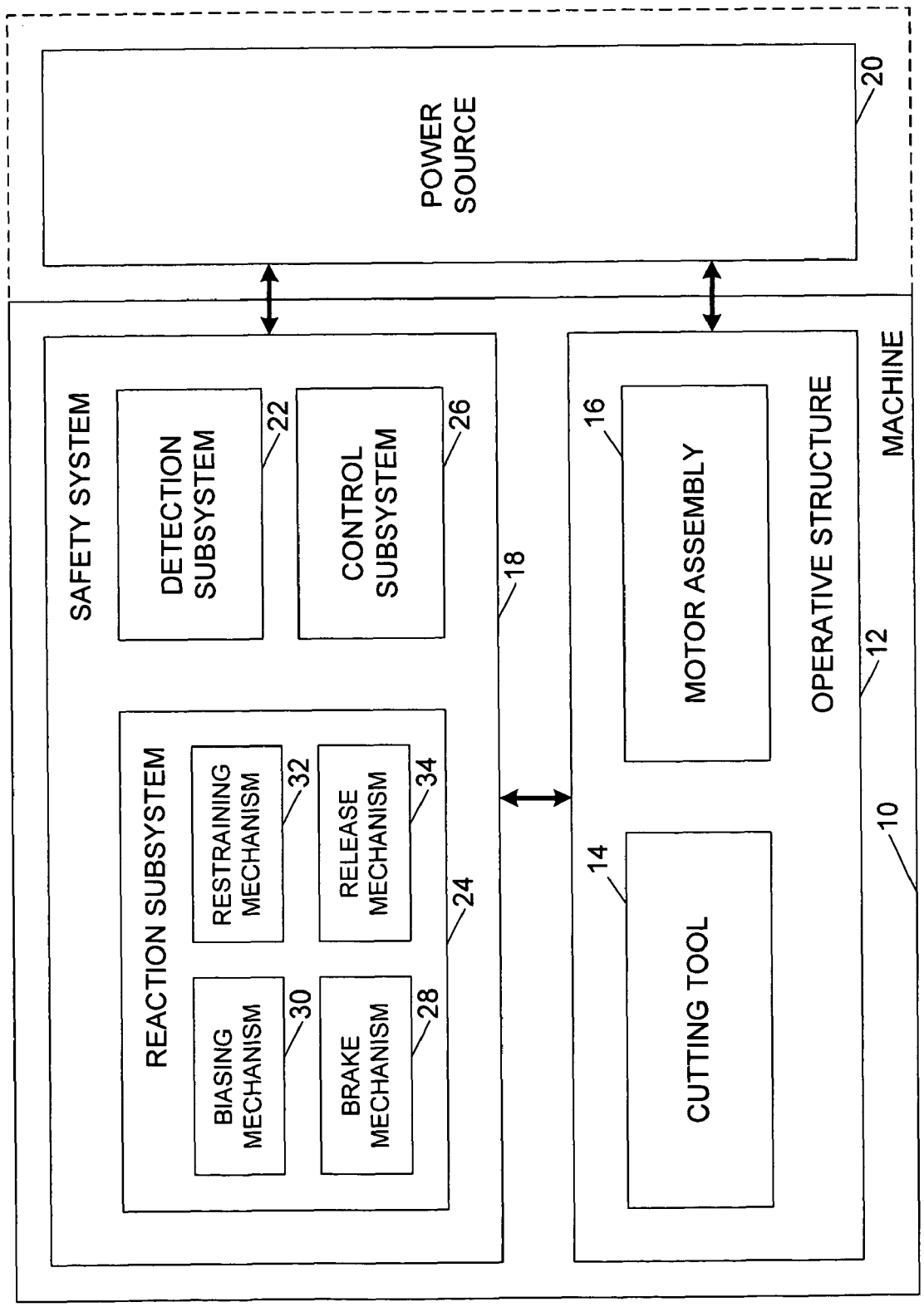
FIG. 1 is a schematic block diagram of a machine with a fast-acting safety system according to the present invention.

A machine that may incorporate a brake positioning system according to the present invention is shown schematically in FIG. 1 and indicated generally at 10. Machine 10 may be any of a variety of different machines adapted for cutting workpieces, such as wood, including a table saw, miter saw (chop saw), radial arm saw, circular saw, band saw, jointer, planer, etc. Machine 10 includes an operative structure 12 having a cutting tool 14 and a motor assembly 16 adapted to drive the cutting tool. Machine 10 also includes a safety system 18 configured to minimize the potential of a serious injury to a person using machine 10. Safety system 18 is adapted to detect the occurrence of one or more dangerous conditions during use of machine 10. If such a dangerous condition is detected, safety system 18 is adapted to engage operative structure 12 to limit any injury to the user caused by the dangerous condition.

Machine 10 also includes a suitable power source 20 to provide power to operative structure 12 and safety system 18. Power source 20 may be an external power source such as line current, or an internal power source such as a battery. Alternatively, power source 20 may include a combination of both external and internal power sources. Furthermore, power source 20 may include two or more separate power sources, each adapted to power different portions of machine 10.

It will be appreciated that operative structure 12 may take any one of many different forms, depending on the type of machine 10. For example, operative structure 12 may include a stationary housing configured to support motor assembly 16 in driving engagement with cutting tool 14. Alternatively, operative structure 12 may include a movable structure configured to carry cutting tool 14 between multiple operating positions. As a further alternative, operative structure 12 may include one or more transport mechanisms adapted to convey a workpiece toward and/or away from cutting tool 14.

Motor assembly 16 includes one or more motors adapted to drive cutting tool 14. The motors may be either directly or indirectly coupled to the cutting tool, and may also be adapted to drive workpiece transport mechanisms. Cutting tool 14 typically includes one or more blades or other suitable cutting implements that are adapted to cut or remove portions from the workpieces. The particular form of cutting tool 14 will vary depending upon the various embodiments of machine 10. For example, in table saws, miter saws, circular saws and radial arm saws, cutting tool 14 will typically include one or more circular rotating blades having a plurality of teeth disposed along the perimetrical edge of the blade. For a jointer or planer, the cutting tool typically includes a plurality of radially spaced-apart blades. For a band saw, the cutting tool includes an elongate, circuitous tooth-edged band.

Safety system 18 includes a detection subsystem 22, a reaction subsystem 24 and a control subsystem 26. Control subsystem 26 may be adapted to receive inputs from a variety of sources including detection subsystem 22, reaction subsystem 24, operative structure 12 and motor assembly 16. The control subsystem may also include one or more sensors adapted to monitor selected parameters of machine 10. In addition, control subsystem 26 typically includes one or more instruments operable by a user to control the machine. The control subsystem is configured to control machine 10 in response to the inputs it receives.

Detection subsystem 22 is configured to detect one or more dangerous, or triggering, conditions during use of machine 10. For example, the detection subsystem may be configured to detect that a portion of the user's body is dangerously close to, or in contact with, a portion of cutting tool 14. As another example, the detection subsystem may be configured to detect the rapid movement of a workpiece due to kickback by the cutting tool, as is described in U.S. Provisional Patent Application Ser. No. 60/182,866, the disclosure of which is herein incorporated by reference. In some embodiments, detection subsystem 22 may inform control subsystem 26 of the dangerous condition, which then activates reaction subsystem 24. In other embodiments, the detection subsystem may be adapted to activate the reaction subsystem directly.

Once activated in response to a dangerous condition, reaction subsystem 24 is configured to engage operative structure 12 quickly to prevent serious injury to the user. It will be appreciated that the particular action to be taken by reaction subsystem 24 will vary depending on the type of machine 10 and/or the dangerous condition that is detected. For example, reaction subsystem 24 may be configured to do one or more of the following: stop the movement of cutting tool 14, disconnect motor assembly 16 from power source 20, place a barrier between the cutting tool and the user, or retract the cutting tool from its operating position, etc. The reaction subsystem may be configured to take a combination of steps to protect the user from serious injury. Placement of a barrier between the cutting tool and teeth is described in more detail in U.S. Provisional Patent Application Ser. No. 60/225,206, entitled "Cutting Tool Safety System," filed Aug. 14, 2000 by SD3, LLC, the disclosure of which is herein incorporated by reference. Retraction of the cutting tool from its operating position is described in more detail in U.S. Provisional Patent Application Ser. No. 60/225,089, entitled "Retraction System For Use In Power Equipment," filed Aug. 14, 2000 by SD3, LLC, the disclosure of which is herein incorporated by reference.

The configuration of reaction subsystem 24 typically will vary depending on which action(s) are taken. In the exemplary embodiment depicted in FIG. 1, reaction subsystem 24 is configured to stop the movement of cutting tool 14 and includes a brake mechanism 28, a biasing mechanism 30, a restraining mechanism 32, and a release mechanism 34. Brake mechanism 28 is adapted to engage operative structure 12 under the urging of biasing mechanism 30. During normal operation of machine 10, restraining mechanism 32 holds the brake mechanism out of engagement with the operative structure. However, upon receipt of an activation signal by reaction subsystem 24, the brake mechanism is released from the restraining mechanism by release mechanism 34, whereupon, the brake mechanism quickly engages at least a portion of the operative structure to bring the cutting tool to a stop.

Figure 2:
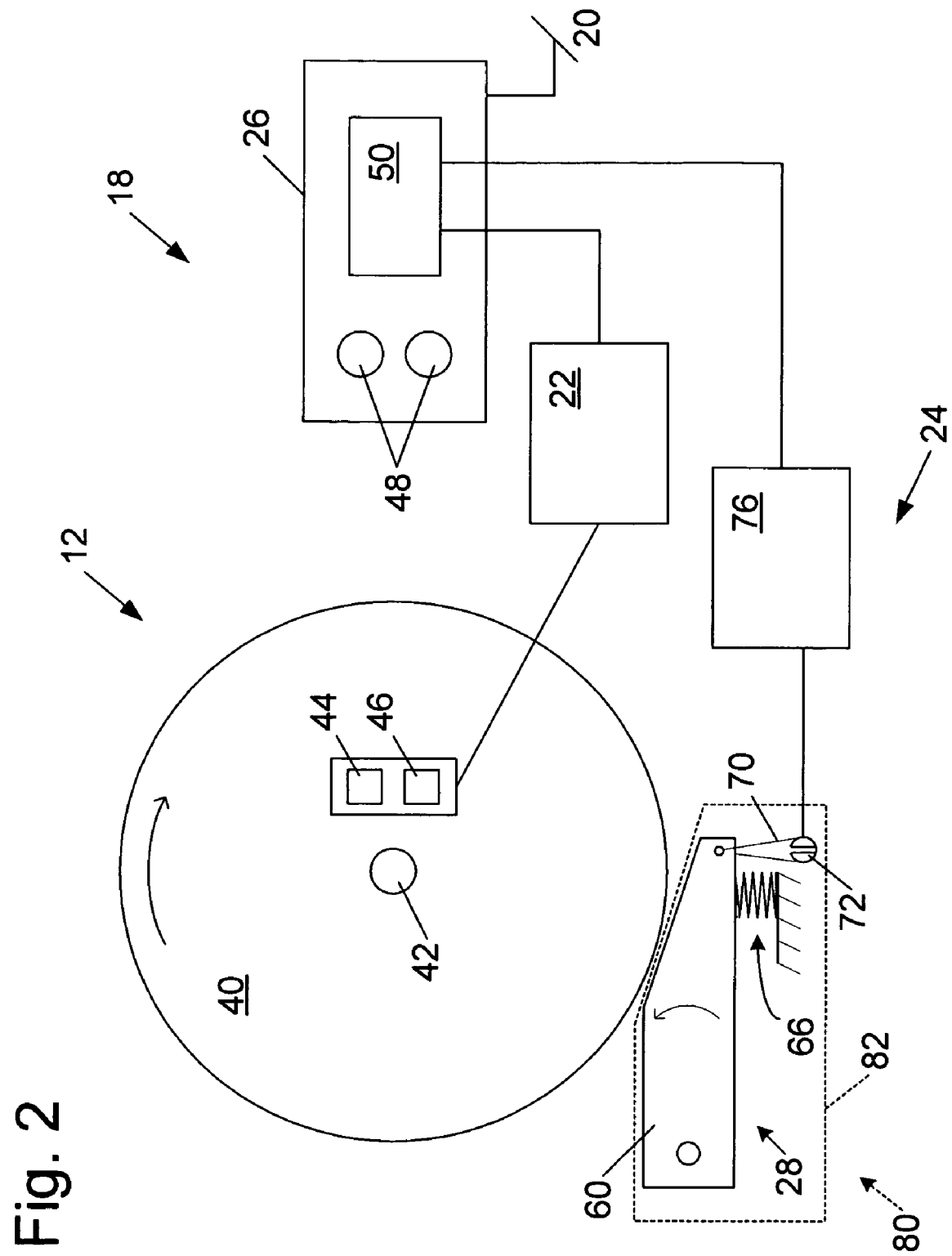
FIG. 2 is a schematic diagram of an exemplary safety system in the context of a machine having a circular blade.

It will be appreciated by those of skill in the art that the exemplary embodiment depicted in FIG. 1 and described above may be implemented in a variety of ways depending on the type and configuration of operative structure 12. Turning attention to FIG. 2, one example of the many possible implementations of safety system 18 is shown. System 18 is configured to engage an operative structure having a cutting tool in the form of a circular blade 40 mounted on a rotating shaft or arbor 42. Blade 40 includes a plurality of cutting teeth (not shown) disposed around the outer edge of the blade. As described in more detail below, braking mechanism 28 is adapted to engage the teeth of blade 40 and stop the rotation of the blade. U.S. Provisional Patent Application Ser. No. 60/225,210, entitled "Translation Stop For Use In Power Equipment," filed Aug. 14, 2000 by SD3, LLC, the disclosure of which is herein incorporated by reference, describes other systems for stopping the movement of the cutting tool. U.S. Provisional Patent Application Ser. No. 60/225,058, entitled "Table Saw With Improved Safety System," filed Aug. 14, 2000 by SD3, LLC, and U.S. Provisional Patent Application Ser. No. 60/225,057, entitled "Miter Saw With Improved Safety System," filed Aug. 14, 2000 by SD3, LLC, the disclosures of which are herein incorporated by reference, describe safety system 18 in the context of particular types of machines 10.

In the exemplary implementation, detection subsystem 22 is adapted to detect the dangerous condition of the user coming into contact with blade 40. The detection subsystem includes a sensor assembly, such as contact detection plates 44 and 46, capacitively coupled to blade 40 to detect any contact between the user's body and the blade. Typically, the blade, or some larger portion of cutting tool 14 is electrically isolated from the remainder of machine 10. Alternatively, detection subsystem 22 may include a different sensor assembly configured to detect contact in other ways, such as optically, resistively, etc. In any event, the detection subsystem is adapted to transmit a signal to control subsystem 26 when contact between the user and the blade is detected. Various exemplary embodiments and implementations of detection subsystem 22 are described in more detail in U.S. Provisional Patent Application Ser. No. 60/225,200, entitled "Contact Detection System For Power Equipment," filed Aug. 14, 2000 by SD3, LLC, and U.S. Provisional Patent Application Ser. No. 60/225,211, entitled "Apparatus And Method For Detecting Dangerous Conditions In Power Equipment," filed Aug. 14, 2000 by SD3, LLC, the disclosures of which are herein incorporated by reference.

Control subsystem 26 includes one or more instruments 48 that are operable by a user to control the motion of blade 40. Instruments 48 may include start/stop switches, speed controls, direction controls, etc. Control subsystem 26 also includes a logic controller 50 connected to receive the user's inputs via instruments 48. Logic controller 50 is also connected to receive a contact detection signal from detection subsystem 22. Further, the logic controller may be configured to receive inputs from other sources (not shown) such as blade motion sensors, workpiece sensors, etc. In any event, the logic controller is configured to control operative structure 12 in response to the user's inputs through instruments 48. However, upon receipt of a contact detection signal from detection subsystem 22, the logic controller overrides the control inputs from the user and activates reaction subsystem 24 to stop the motion of the blade. Various exemplary embodiments and implementations of control subsystem 26 are described in more detail in U.S. Provisional Patent Application Ser. No. 60/225,059, entitled "Logic Control For Fast Acting Safety System," filed Aug. 14, 2000 by SD3, LLC, and U.S. Provisional Patent Application Ser. No. 60/225,094, entitled "Motion Detecting System For Use In Safety System For Power Equipment," filed Aug. 14, 2000 by SD3, LLC, the disclosures of which are herein incorporated by reference.

In the exemplary implementation, brake mechanism 28 includes a pawl 60 mounted adjacent the edge of blade 40 and selectively moveable to engage and grip the teeth of the blade. Pawl 60 may be constructed of any suitable material adapted to engage and stop the blade. As one example, the pawl may be constructed of a relatively high strength thermoplastic material such as polycarbonate, ultrahigh molecular weight polyethylene (UHMW) or Acrylonitrile Butadiene Styrene (ABS), etc., or a metal such as aluminum, etc. It will be appreciated that the construction of pawl 60 will vary depending on the configuration of blade 40. In any event, the pawl is urged into the blade by a biasing mechanism in the form of a spring 66. In the illustrative embodiment shown in FIG. 2, pawl 60 is pivoted into the teeth of blade 40. It should be understood that sliding or rotary movement of pawl 60 might also be used. The spring is adapted to urge pawl 60 into the teeth of the blade with sufficient force to grip the blade and quickly bring it to a stop.

The pawl is held away from the edge of the blade by a restraining mechanism in the form of a fusible member 70. The fusible member is constructed of a suitable material adapted to restrain the pawl against the bias of spring 66, and also adapted to melt under a determined electrical current density. Examples of suitable materials for fusible member 70 include NiChrome wire, stainless steel wire, etc. The fusible member is connected between the pawl and a contact mount 72. Preferably, fusible member 70 holds the pawl relatively close to the edge of the blade to reduce the distance the pawl must travel to engage the blade. Positioning the pawl relatively close to the edge of the blade reduces the time required for the pawl to engage and stop the blade. Typically, the pawl is held approximately $\frac{1}{32}$-inch to $\frac{1}{4}$-inch from the edge of the blade by fusible member 70, however other pawl-to-blade spacings may also be used within the scope of the invention.

Pawl 60 is released from its unactuated, or cocked, position to engage blade 40 by a release mechanism in the form of a firing subsystem 76. The firing subsystem is coupled to contact mount 72, and is configured to melt fusible member 70 by passing a surge of electrical current through the fusible member. Firing subsystem 76 is coupled to logic controller 50 and activated by a signal from the logic controller. When the logic controller receives a contact detection signal from detection subsystem 22, the logic controller sends an activation signal to firing subsystem 76, which melts fusible member 70, thereby releasing the pawl to stop the blade. Various exemplary embodiments and implementations of reaction subsystem 24 are described in more detail in U.S. Provisional Patent Application Ser. No. 60/225,056, entitled "Firing Subsystem For Use In Fast Acting Safety System," filed Aug. 14, 2000 by SD3, LLC, U.S. Provisional Patent Application Ser. No. 60/225,170, entitled "Spring-Biased Brake Mechanism for Power Equipment," filed Aug. 14, 2000 by SD3, LLC, and U.S. Provisional Patent Application Ser. No. 60/225,169, entitled "Brake Mechanism For Power Equipment," filed Aug. 14, 2000 by SD3, LLC, the disclosures of which are herein incorporated by reference.

It will be appreciated that activation of the brake mechanism will require the replacement of one or more portions of safety system 18. For example, pawl 60 and fusible member 70 typically must be replaced before the safety system is ready to be used again. Thus, it may be desirable to construct one or more portions of safety system 18 in a cartridge that can be easily replaced. For example, in the exemplary implementation depicted in FIG. 2, safety system 18 includes a replaceable cartridge 80 having a housing 82. Pawl 60, spring 66, fusible member 70 and contact mount 72 are all mounted within housing 82. Alternatively, other portions of safety system 18 may be mounted within the housing. In any event, after the reaction system has been activated, the safety system can be reset by replacing cartridge 80. The portions of safety system 18 not mounted within the cartridge may be replaced separately or reused as appropriate. Various exemplary embodiments and implementations of a safety system using a replaceable cartridge are described in more detail in U.S. Provisional Patent Application Ser. No. 60/225,201, entitled "Replaceable Brake Mechanism For Power Equipment," filed Aug. 14, 2000 by SD3, LLC, the disclosure of which is herein incorporated by reference.

While one particular implementation of safety system 18 has been described, it will be appreciated that many variations and modifications are possible within the scope of the invention. Many such variations and modifications are described in U.S. Provisional Patent Application Ser. Nos. 60/182,866 and 60/157,340, the disclosures of which are herein incorporated by reference.

Figure 3:
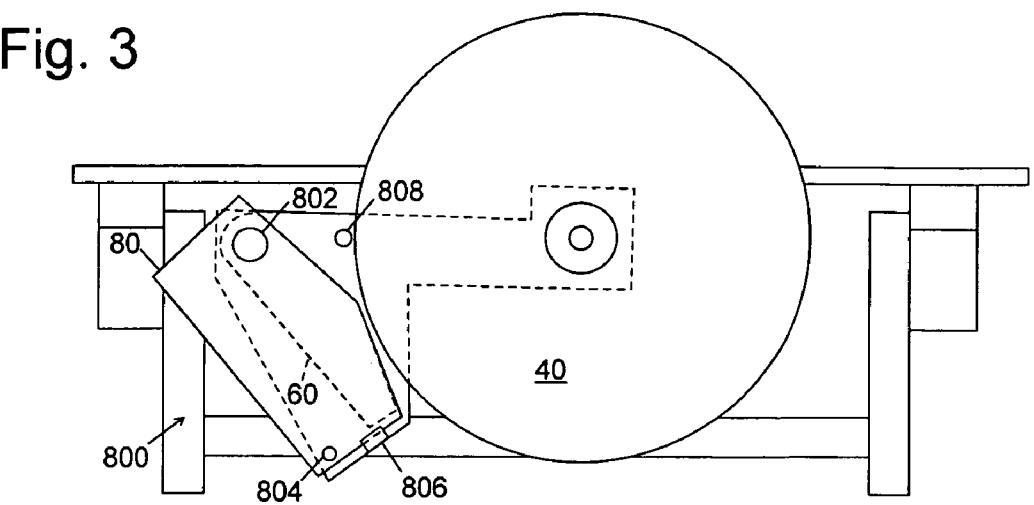
FIG. 3 is a side elevation view of a brake positioning system.

A brake positioning system according to the present invention is shown generally at 800 in FIG. 3. Cartridge 80 and brake pawl 60 are typically pivotally mounted on a large pin 802. The cartridge and pawl are fixed together until the brake is fired, at which time the brake pawl is shoved rapidly into the blade. The motion of the blade and geometry of the pawl then cause the blade to drive deeply into the pawl creating tremendous deceleration. Pin 802 is sufficiently large, typically 0.75 inches, to absorb the impact of deceleration without damage. The large diameter of pin 802 also reduces the chance that it will fracture brake pawl 60 during braking. The pivotal mounting of the cartridge on the pin permits the spacing between the blade and the face of the brake pawl to be adjusted by rotating the cartridge around the pin. The brake position system serves to establish and maintain the proper spacing between the face of the pawl and the perimeter of blade 40.

In its simplest form, brake positioning system 800 incorporates a fixed pin 804 to position cartridge 80, and thereby brake pawl 60. This arrangement is generally sufficient where the size of the blade is known and sufficiently fixed for all blades that might be used. Pin 804 is arranged parallel to pin 802 to allow cartridge 80 to be slid onto both pins simultaneously. A flexible snap clip 806 snaps over the edge of cartridge 80 to retain it on the pins. When the cartridge is to be removed, the clip is lifted away from the cartridge, and the cartridge is slipped off of the pins. A clearance pin 808 is preferably mounted at a fixed radius from the arbor axis, $5\frac{1}{16}^{th}$ inches for instance, to insure that no larger blade than will clear the pawl will fit on the saw. The clearance pin is preferably located at a just slightly smaller radial position from the arbor than the nearest portion of the pawl so that the blade will contact the pin prior to contacting the pawl. Alternatively, the pin may take the form of a curved arc that is sufficiently large to insure that at least one tooth of the blade will engage it.

Figure 4:
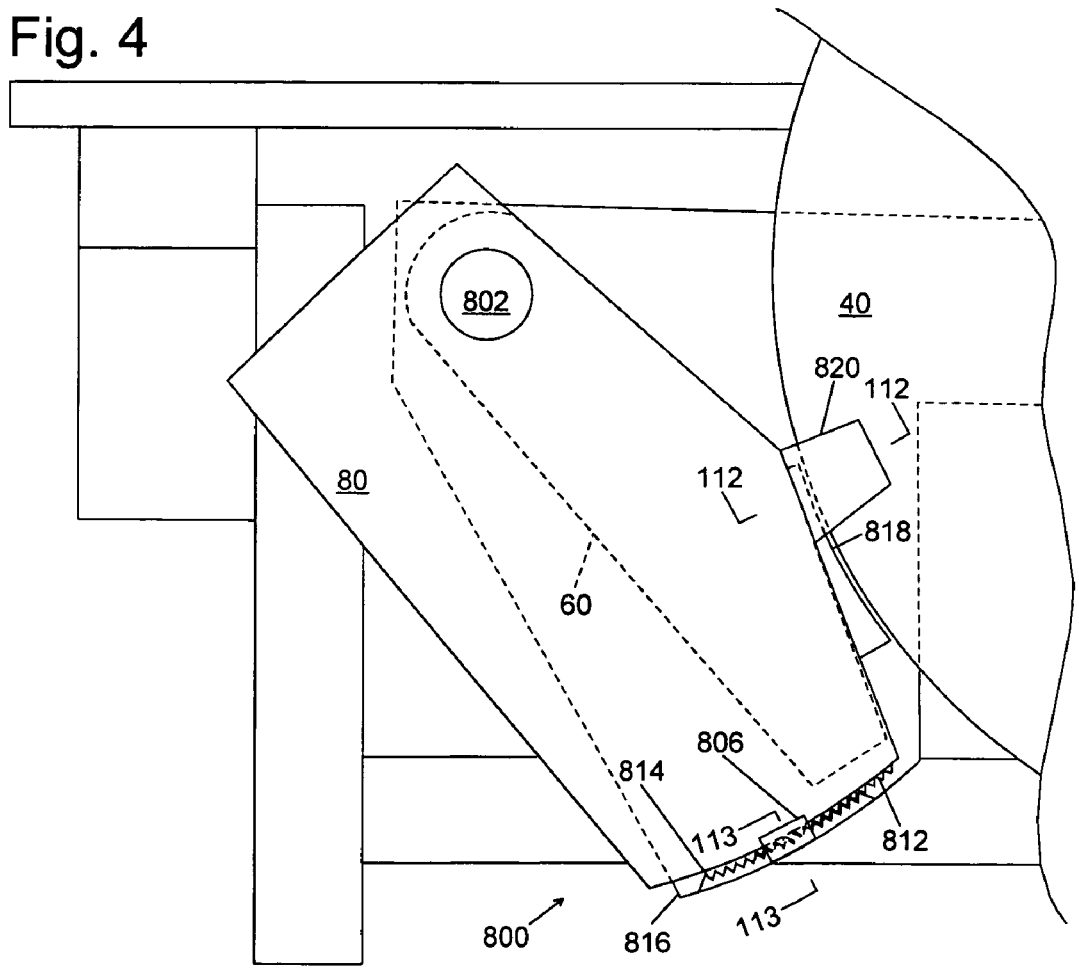
FIG. 4 is a side elevation view of an adjustable brake positioning system.
Figure 5:
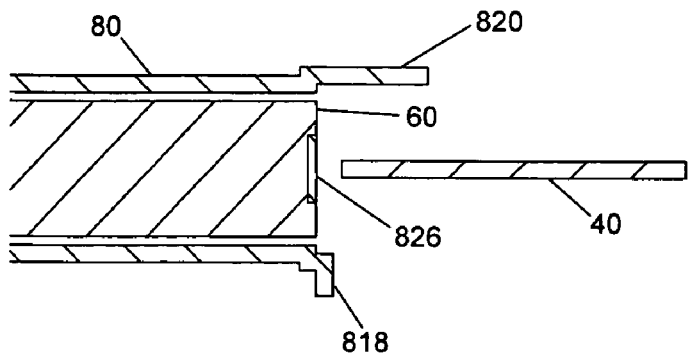
FIG. 5 is cross-sectional view of a portion of the brake positioning system of FIG. 4, taken along line 5-5.
Figure 6:
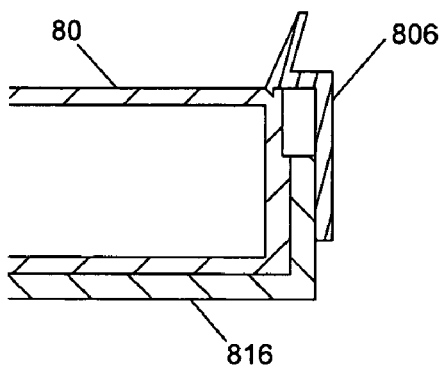
FIG. 6 is a cross-sectional view of a portion of the brake positioning system of FIG. 4, taken along line 6-6.

An adjustable brake positioning system 800 is shown in FIGS. 4-6. Brake positioning system 800 includes a plurality of positioning teeth 812 formed on the back of cartridge 80. A corresponding plurality of positioning teeth 814 are formed on a cartridge mounting surface 816. The teeth preferably have a pitch of approximately $\frac{1}{32}$nd to $\frac{1}{4}^{th}$ of an inch. The teeth are spaced so that relatively small adjustments can be made by selecting where to engage the teeth. A curved wall 818 is formed along part of the inside front edge of the cartridge. The curved wall 818 is positioned to engage the perimeter of the blade just prior to the positioning teeth engaging each other as the cartridge is slipped onto pin 802. This insures that the pawl will be spaced back from the blade by at least the distance the wall projects forward from the pawl—typically $\frac{1}{16}^{th}$ to $\frac{1}{8}^{th}$ inch. Once the positioning teeth are engaged, the rotational position of the cartridge is fixed. The cartridge is then slid the rest of the way onto the pin. Snap clip 806 retains the cartridge against mounting surface and in proper position. A tab 820 formed on the edge of the cartridge extends over the blade. The tab blocks the blade from being removed unless the cartridge is partially disengaged and rotated back away from the blade. Thus, the tab insures that the blade cannot be removed and replaced with a new blade without resetting the position of the cartridge. It can be seen that by making the cartridge pivotal on pin 802, adjustable positioning of the brake pawl relative to the blade is simplified.

Figure 7:
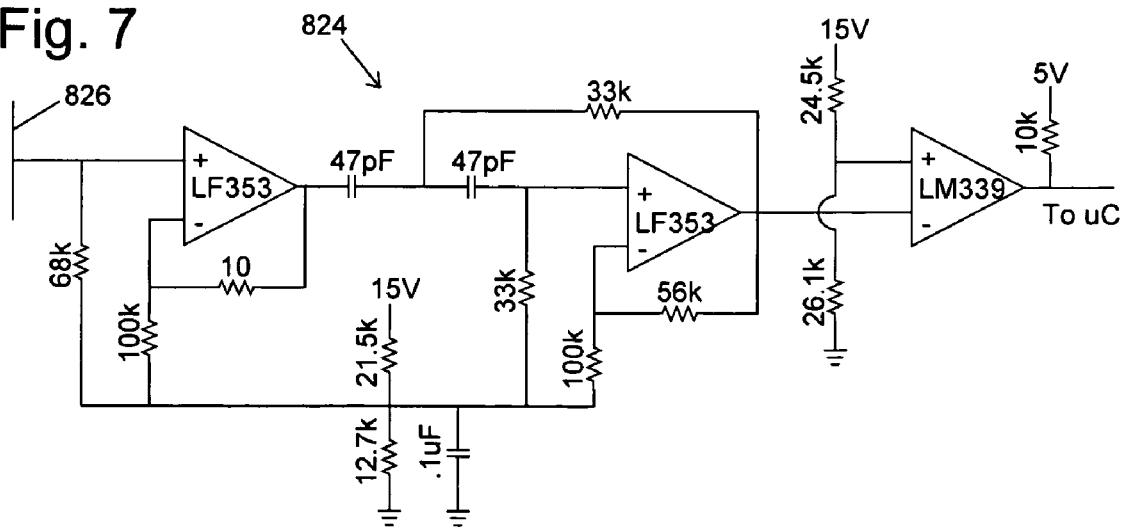
FIG. 7 is a circuit diagram of a blade-to-pawl spacing measurement system.

Because of the importance of establishing correct pawl-to-blade spacing, it may be desirable to incorporate a spacing detection system to insure correct spacing. One example of such a system is shown at 824 in FIG. 7. System 824 includes an electrode 826 located on the face of the pawl adjacent the blade. As described in U.S. Provisional Patent Application Ser. No. 60/225,200, titled "Contact Detection System for Power Equipment," and U.S. Provisional Patent Application Ser. No. 60/225,211, titled "Apparatus and Method for Detecting Dangerous Conditions in Power Equipment," both filed Aug. 14, 2000, in one contact detection system suitable for use with the present invention, an electrical signal is applied to the blade via a drive electrode. This signal can be picked up by electrode 826 and monitored to ensure that it has an amplitude in a predetermined range. In particular, the amplitude detected by electrode 826 will fall off rapidly with distance from the blade. Therefore, by monitoring the detected amplitude, proper spacing can be verified. The system preferably deactivates or prevents initial actuation of the machine if the detected spacing is outside normal range. The user is then signaled to make appropriate adjustment. Electrode 826 may take many forms, including capacitive plates, optical sensors, magnetic sensors, etc.

Figure 8:
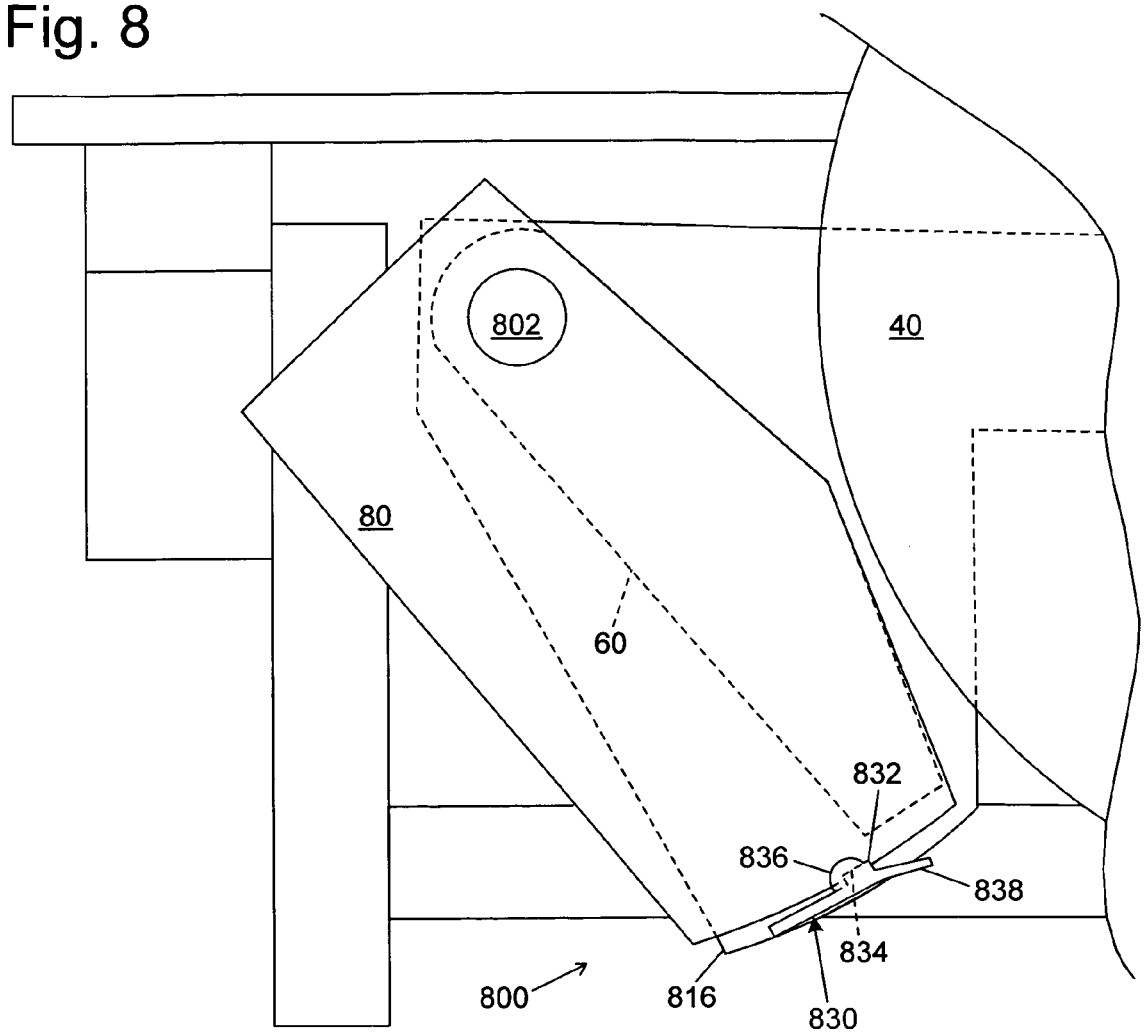
FIG. 8 is a side elevation view of an alternative brake positioning system.

An alternative brake positioning system 800 is shown in FIG. 8. The position system of FIG. 8 utilizes a snap catch 830 with a rib 832 facing the cartridge. The catch is mounted to cartridge support surface 816 and is biased to push against the cartridge. The end face of the cartridge includes a groove 834 adapted to receive rib 832. In use, the cartridge is slipped over pin 802 while rotated back from the blade. Once the cartridge is fully installed on the pin, it is rotated forward until rib 832 snaps into groove 834. A small ledge 836 projects over the edge of cartridge 80 when the rib is engaged in the groove to prevent the cartridge from vibrating off along the axis of the pin. Once the cartridge is fired, the user can lift tab 838 to disengage the rib and allow the cartridge to rotate back. The backward rotation can be used to release any remaining pressure from the actuation spring, if any, in the cartridge.

Figure 9:
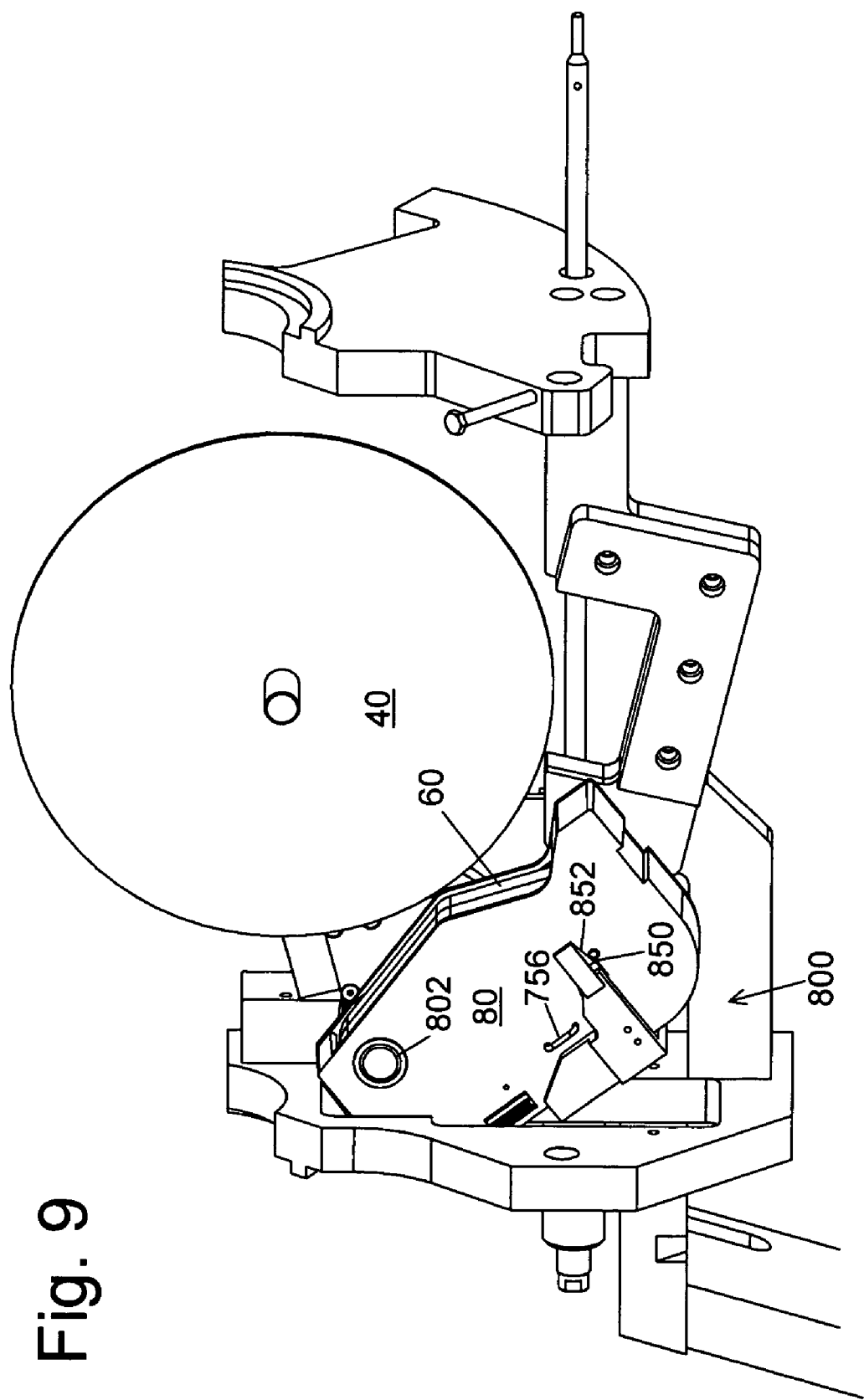
FIG. 9 is an isometric view of an alternative brake positioning system.

FIG. 9 shows another brake positioning system 800. In the system of FIG. 9, cartridge 80 includes a recess 850 formed on one side. A spring latch 852 is positioned to engage recess 850 as cartridge 80 is rotated back away from the blade. The latch is positioned to locate the face of the pawl approximately $\frac{1}{8}^{th}$ of an inch away from the perimeter of the blade, although different spacing could of course be used. The user can remove the cartridge by lifting the latch, rotating the cartridge forward until it clears the latch and then sliding the cartridge off pin 802. As described in more detail in U.S. Provisional Patent Application Ser. No. 60/225,201, titled "Replaceable Brake Mechanism for Power Equipment," filed Aug. 14, 2000, when the cartridge is fired, the pawl will normally be somewhat embedded on the blade and biased toward the blade by a spring 66. A release pin 756 is removable to release the back of the spring and remove the biasing pressure. This allows the pawl to be loosened from the blade more easily and eliminates the pressure on the blade that would otherwise make removal of the blade more difficult.

Logic controller 50 may also be configured to monitor the pawl-to-blade spacing. Many cutting tools such as saw blades do not have precisely uniform dimensions. As a result, when a new blade is installed on a saw, for example, the pawl may no longer be correctly spaced from the blade. An incorrectly positioned pawl may slow the stopping speed of the pawl or prevent the pawl from stopping the blade. Therefore, to ensure the blade is stopped with uniform braking speed, it may be necessary to adjust the position of the pawl whenever a blade is replaced. Configuring logic controller 50 to detect incorrect blade-to-pawl spacing, as described above and as described in U.S. Provisional Patent Application Ser. No. 60/225,059, entitled "Logic Control For Fast Acting Safety System," provides an additional level of assurance that a user is protected against accidental contact with the blade.

Figure 10:
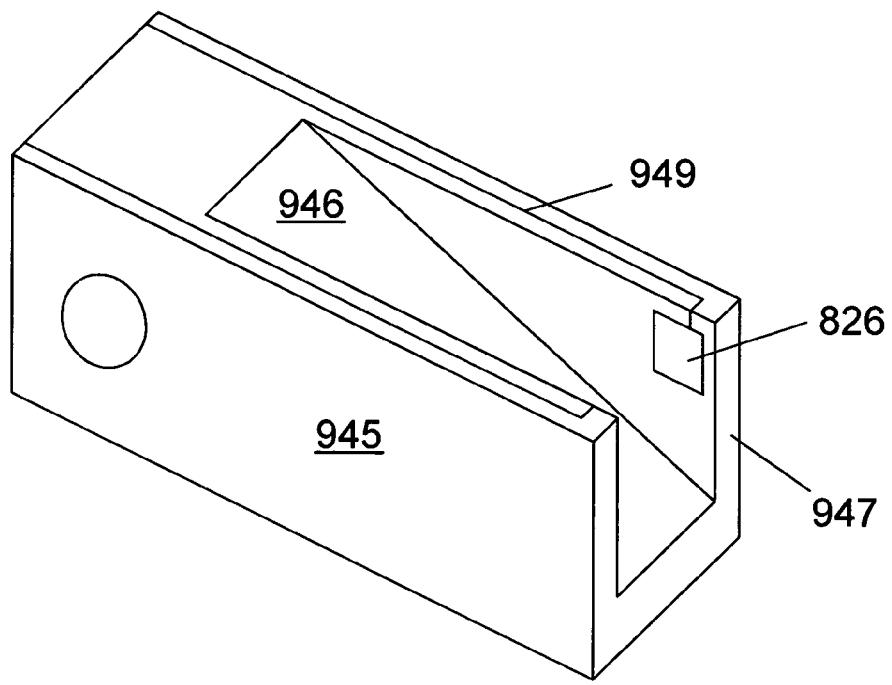
FIG. 10 is an isometric view of an exemplary pawl adapted for measuring pawl-to-blade spacing.

It will be appreciated that there are many ways in which incorrect spacing between blade 40 and pawl 60 may be detected. One such way is described above in connection with FIGS. 5 and 7. As another example, FIG. 10 illustrates a pawl 945 having a capacitive system for detecting correct pawl spacing. Similar to pawl 40 shown in FIG. 2, pawl 945 may include a portion 946 that is beveled or otherwise shaped to quickly and completely engage the teeth of a cutting tool. In addition, pawl 945 includes a pair of generally parallel, spaced-apart arms 947 which extend beyond portion 946. Arms 947 are disposed to extend on either side of the blade, without touching the blade, when the pawl is in place adjacent the blade. Each arm includes a capacitor plate electrode 826 disposed on the inside surface of the arm adjacent the blade. Conductive leads 949 run from each plate 826 to suitable blade detector circuitry.

Capacitor plates 826 are positioned on arms 947 such that, when the pawl spacing is within a desired range, the blade extends between the two capacitor plates. It will be appreciated that the capacitance across plates 826 will vary depending on whether the blade is positioned between the sensors. The blade detector circuitry is configured to drive an electrical signal through conductive leads 949 and to detect changes in the capacitance across the plates. Suitable circuitry that may be used with pawl 945 is well known to those of skill in the art. One exemplary pawl-to-blade spacing detection circuit was discussed above and is shown in FIG. 7. An electrical signal applied to the blade can be picked up by either or both of plates 826 and monitored to insure that the signal has an amplitude in a predetermined range. By monitoring the detected amplitude, proper spacing can be verified. If the proper signal is not detected, a circuit, such as circuit 824 in FIG. 7, conveys an error signal to logic controller 50, which prevents operation of machine 10 until proper pawl-to-blade spacing is detected. Other examples include circuits similar to the exemplary contact detection circuits described in U.S. Provisional Application Ser. No. 60/225,200 entitled "Contact Detection System for Power Equipment."

Capacitor plates 826 can optionally be shaped to detect when the pawl is too close to the blade as well as not close enough. Alternatively, two pairs of capacitor plates may be positioned on the pawl: one pair to detect if the pawl is too close to the blade, and the other pair to detect if the pawl is too far from the blade. In any event, the detector circuitry is configured to transmit an error signal to logic controller 50, which then takes appropriate action.

While exemplary automatic pawl spacing detection systems have been described above, it will be appreciated that there are many possible variations within the scope of the invention. For example, both capacitor plates may be positioned on the same side of the blade rather than on opposite sides. The plates and/or blade detection circuitry may be separate from the pawl. In the latter case, for example, the plates and detection circuitry may be mounted on a separate electronics board associated with the pawl. Alternatively, the plates may be replaced with one or more light-emitting diodes and detectors such that, when the pawl is properly positioned, the blade obstructs the optical path between the diodes and detectors. Other methods of detecting the proximity of the blade to the pawl are also possible. As a further option, plates 826 may function as charge plates 44, 46 as well as pawl-spacing detectors. In addition, a plate may be mounted on beveled face of a pawl, such as on face 946 of the pawl shown in FIG. 10. This plate can be used to detect the drive input signal used for contact detection. The amplitude of the signal detected at the plate will be inversely proportional to the space between the sensor and the teeth of the blade. If this signal does not have an amplitude over a given threshold, the system would interpret this as indicating that the pawl face is not close enough to the blade.

In embodiments where portions of safety system 18 are mounted in a replaceable cartridge 80, the correct blade-to-pawl spacing may be detected by measuring the blade-to-cartridge spacing. For example, capacitor plates 826 may be placed on cartridge housing 82 rather than on a pawl itself.

INDUSTRIAL APPLICABILITY

The present invention is applicable to power equipment, and specifically to woodworking equipment such as table saws, miter saws, band saws, circular saws, jointers, etc.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

The invention claimed is:

1. A woodworking machine comprising:
a blade;
a detection system adapted to detect a dangerous condition between a person and the blade;
a mounting pin;
a brake supported by the mounting pin, where the brake is adapted to decelerate the blade in response to detection of the dangerous condition; and
a brake positioning system configured to pivot the brake on the mounting pin to selectively position the brake relative to the blade without activating the brake to decelerate the blade;
where the blade is planar and where the brake positioning system is configured to pivot the brake around an axis perpendicular to the plane of the blade.

2. The woodworking machine of claim 1, where the dangerous condition is contact between a person and the blade.

3. The woodworking machine of claim 1, where the dangerous condition is proximity between a person and the blade.

4. The woodworking machine of claim 1, where the machine is a table saw.

5. The woodworking machine of claim 1, where the blade is a circular blade with a cutting edge at its perimeter.

6. The woodworking machine of claim 5, where the mounting pin is positioned beyond the cutting edge of the blade.

7. The woodworking machine of claim 1, where the blade has a cutting edge, and where the brake positioning system is configured to pivot the brake toward and away from the cutting edge.

* * * * *